United States Patent [19]

Ueda et al.

[11] Patent Number: 5,740,313
[45] Date of Patent: Apr. 14, 1998

[54] LIGHT BEAM HEATING APPARATUS

[75] Inventors: Masayoshi Ueda, Ashiya; Tamotsu Ikeda, Toyonaka; Moriaki Kawasaki, Habikino; Nobuyuki Haji, Osaka, all of Japan

[73] Assignee: Matsushita Electric Industrial Co., Ltd., Kadoma, Japan

[21] Appl. No.: 550,610

[22] Filed: Oct. 31, 1995

[30] Foreign Application Priority Data

Oct. 31, 1994 [JP] Japan .................... 6-266954

[51] Int. Cl.⁶ .............................................. F21V 7/00
[52] U.S. Cl. .................... 392/419; 347/175; 355/208; 392/418; 219/497; 219/510
[58] Field of Search .................... 392/419, 420, 392/421, 422, 407; 315/117, 112, 307, 309; 347/175; 362/294; 219/492, 497, 507, 509, 510; 174/257; 361/751; 355/208

[56] References Cited

U.S. PATENT DOCUMENTS

| | | | |
|---|---|---|---|
| 4,283,658 | 8/1981 | Parker | 315/117 |
| 4,518,895 | 5/1985 | Lehman | 315/117 |
| 4,630,182 | 12/1986 | Moroi et al. | 362/294 |
| 4,695,714 | 9/1987 | Kimizuka et al. | 250/205 |
| 5,063,284 | 11/1991 | Sunada | 219/497 |
| 5,150,154 | 9/1992 | Kuwabara | 355/208 |
| 5,332,869 | 7/1994 | Hagiwara | 174/257 |
| 5,565,903 | 10/1996 | Ueda | 347/175 |

Primary Examiner—Tu B. Hoang
Attorney, Agent, or Firm—Wenderoth, Lind & Ponack

[57] ABSTRACT

During a preheating period of a light beam heating apparatus for heating a material locally with a light beam, fans for cooling a lamp for generating a light beam are not operated. A power source supplies current to a lamp. A current detector detects the current supplied to the lamp from the power source. A delay circuit delays a current detection value from the current detector for a predetermined time period and then sends the value to a controller. Then, the controller starts to activate fans for cooling the lamp. Alternately, a temperature detector is provided to detect the temperature of the lamp. When the temperature reaches a prescribed temperature, the controller starts to activate fans for cooling the lamp. Thus, the internal temperature of the lamp reaches the thermal saturation temperature in a shorter period of time, and the optical energy for heating can be stabilized after preheating.

11 Claims, 5 Drawing Sheets

LIGHT BEAM HEATING APPARATUS

BACKGROUND OF THE INVENTION

1. Field of the Invention

The present invention relates to a light beam heating apparatus which can heat a material locally.

2. Description of the Prior Art

A light beam heating apparatus as a non-contact local heating apparatus is used for soldering of electronics parts, heating and fusing a resin material and the like. The apparatus can heat a material locally by condensing a light from a light emitting lamp to be incident at an end of an optical fiber and by condensing the light coming from the other end of the optical fiber while putting the material at a focal position of the light beam. Such an apparatus is used for soldering of electronics parts, heating and fusing a resin material and the like.

For example, a lamp such as a Xenon lamp is used as the light emitting lamp. The lamp is turned on by a power supply, and it emits a light by supplying a constant lamp current. Usually, lamps such as a Xenon lamp includes inert gas of a few atmospheric pressure, and the gas is sealed with a sealant having a relatively low melting point. Then, a cooling fan is provided usually to blow a cooling wind toward a surface of the lamp in order to keep the temperature of the sealant below the melting point during the time that the lamp is lighted.

For example, when a Xenon lamp with a tungsten electrode is used, a discharge arc is maintained by emission of thermoelectrons. Therefore, in a period of minutes just after the lamp is turned on, the electrode and the inert gas in the lamp are not heated sufficiently and the discharge phenomenon is unstable. Then, after the lamp is turned on, the lamp is preheated several minutes with a constant lamp current, and after the preheating, the light emitted from the lamp is permitted to enter the optical fiber for heating.

However, the cooling fan is also activated when the lamp is turned on, or cooling is performed at the same time as the preheating. Further, the optical output of the lamp changes for a few tens of minutes after turning on the lamp. Therefore, heating of a material cannot be performed stably or in a reproducible way for at least several minutes. On the other hand, if the preheating period is extended for a sufficiently long period until thermal saturation is attained in the lamp, heating is not efficient and therefore the lamp cannot be used practically.

SUMMARY OF THE INVENTION

An object of the present invention is to provide a light beam heating apparatus which can supply a light beam to reproduce desired heating conditions at the start of an operation for heating a material.

During a preheating period of a light beam heating apparatus for heating a material locally with a light beam, fans for cooling a lamp for generating a light beam are not operated. A current supplied to a lamp and delayed by a delay circuit is supplied to a controller. A cooling means such as a cooling fan is provided to prevent the melting or deterioration of the sealant of the lamp. Then, the controller starts to activate fans for cooling the lamp. Alternately, a temperature detector is provided to detect the temperature of the lamp. When the temperature reaches a prescribed temperature, the controller starts to activate fans for cooling the lamp. Even if the fans are not operated, the temperature of the sealant of the lamp does not exceed the low melting point thereof. Thus, the internal temperature of the lamp resin faster to the thermal saturation temperature, and the optical energy for heating can be stabilized after preheating.

An advantage of the present invention is that the preheating period of the lamp can be shortened.

Another advantage of the present invention is that the optical energy for heating after the preheating period of the lamp can be stabilized at an earlier time.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
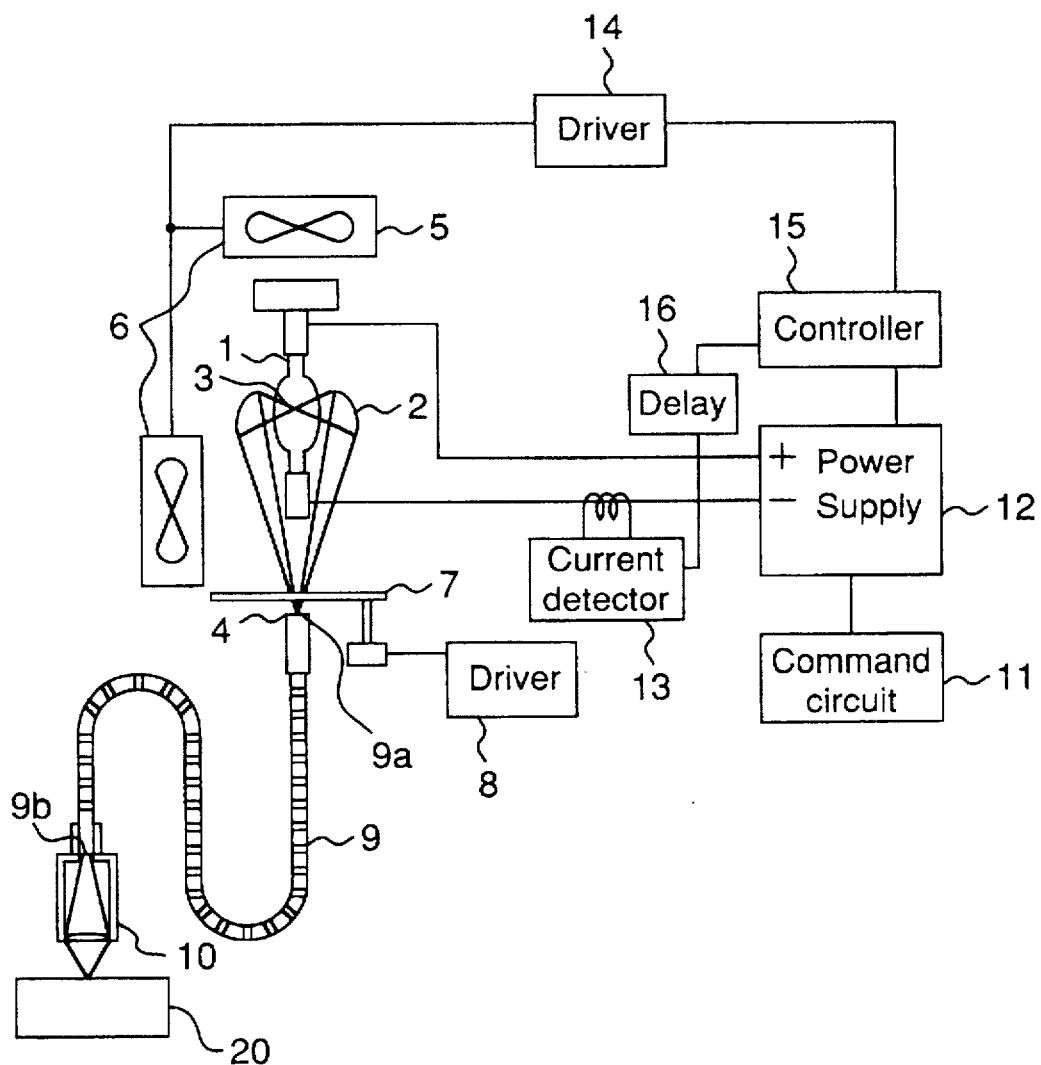
FIG. 1 is a diagram of a light beam heating apparatus of a first embodiment of the invention.

Referring now to the drawings, wherein like reference characters designate like or corresponding parts throughout the several views, FIG. 1 shows a light beam heating apparatus according to a first embodiment of the invention. A light emitting lamp 1 such as a Xenon lamp is mounted at a base enclosed with a elliptic mirror 2 having a first focal point 3 and a second focal point 4. A light emitting point of the lamp 1 is located at the first focal point 3. Cooling fans 6 are set at two sides of the lamp 1 to cool it. A driver 14 drives the fans 6. A shutter 7 is arranged opposite to the base with respect to the lamp 1, and it is driven by a driver 8. An optical fiber 9 is located near the shutter 7 on an opposite side relative to the lamp 1, so that a light receiving end 9a thereof is located at the second focal point 4. A light emitted from the lamp 1 is condensed by the elliptic mirror 2 at the first focal point 4, and the condensed beam enters into the optical fiber 9 at the light receiving end 9a thereof to be transmitted through the optical fiber 9 and to emerge from another end 9b of the optical fiber 9. The shutter 7 opens or closes the beam by the driver 8, and the driver 8 opens the shutter 7 only when soldering or the like is performed. A lens unit 10 comprising an optical lens system is connected to the other end 9b of the optical fiber for condensing the beam emitted from the end 9b into a light beam. A command circuit 11 sets conditions on heating output. A power supply 12 controls the lamp current to the lamp 1 according to the command from the command circuit 11 and the turning on of the lamp 1. A current detector 13 detects a lamp current supplied from the power supply 12 to the lamp 1, and a delay circuit 16 delays a current detection value of the current detector 13 by a predetermined time and sends it to a controller 15. The controller 15 receives the current detection value from the detector 13 through the delay circuit 16 to output a command to the driver 14 for activating the fans 6.

Next, the operation of the light beam heating apparatus is explained. First, the lamp 1 is turned on by the power supply 12, and it lights with a constant lamp current. When the lamp 1 is heated from room temperature naturally due to self heating thereof, the temperature of the lamp 1 does not increase for a few minutes above the melting point of the sealant of the lamp 1. Therefore, the lamp 1 is not needed to be cooled by the fans 6 for a few minutes after being turned on.

The current detector 13 starts to detect the lamp current at the same time as the lighting of the lamp 1, and the delay circuit 16 sends the current detection value after the predetermined time to the controller 15. When the controller 15 receives the current detection value, it sends a start command to the driver 14 for the fans 6. Then, the driver 14 drives the fans 6 readily. When the shutter 7 is opened by the driver 8 after the preheating period, the lamp 1 emits a light with a current set by the command circuit 11, and a beam condensed by the elliptic mirror 2 is transmitted through the optical fiber 9 and condensed again by the lens system 10 to irradiate a material to be heated (not shown) for soldering of electronics parts, fusing of resin, or the like.

Figure 2:
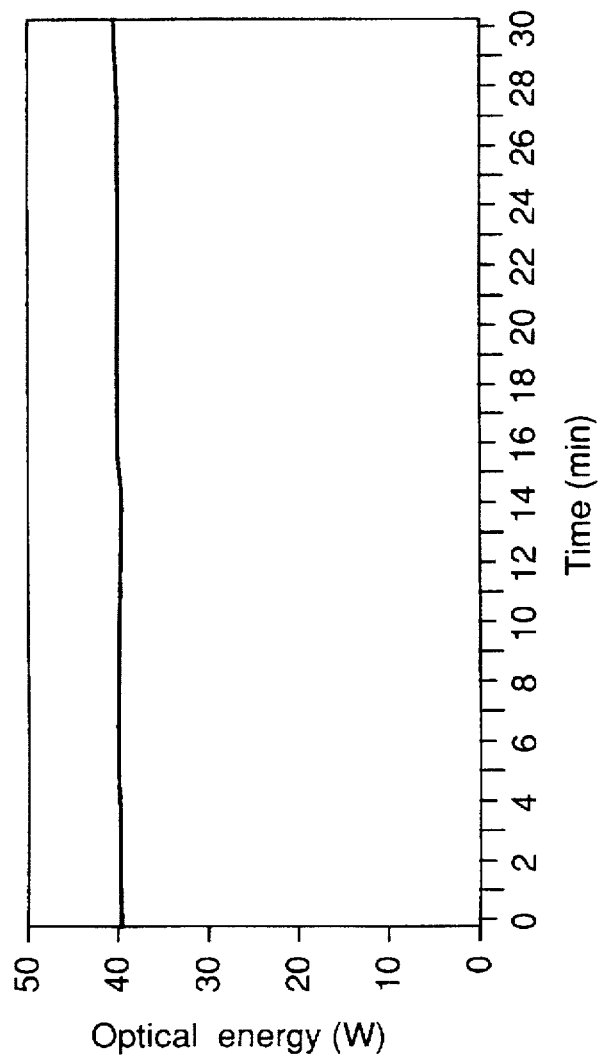
FIG. 2 is a graph of the time dependence of optical energy of the apparatus shown in FIG. 1.

FIG. 2 shows the time dependence of optical energy measured at the outgoing end 9b of the optical fiber 9 of the apparatus shown in FIG. 1. As explained above, after the lamp 1 is preheated with a constant current for a few minutes after being turned on, the lamp 1 is heated with a current according to a command received from the command circuit 11 and the shutter 7 is opened. Then, the light energy is measured with a power meter for thirty minutes. The data shown in FIG. 2 shows that the optical energy is stable for a long time.

Figure 3:
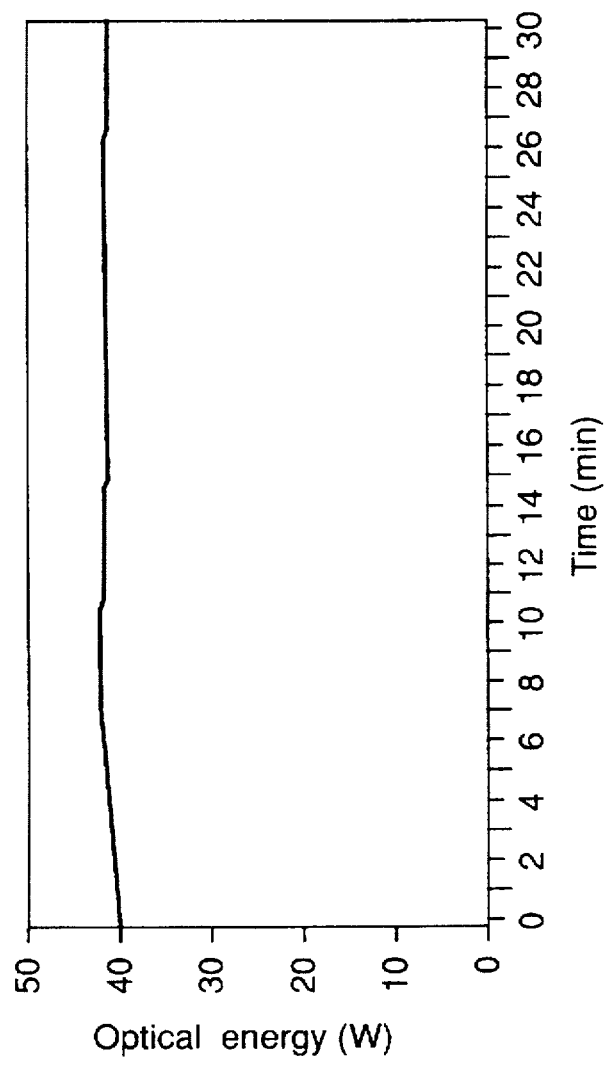
FIG. 3 is a graph of the time dependence of optical energy of a prior art apparatus.

For comparison, FIG. 3 shows the time dependence of optical energy of a prior art apparatus wherein the delay circuit 16 is not used and the fans 6 are activated at the same time as the lamp 1 is turned on. The data shows that the apparatus of the first embodiment has superior stability relative to light energy.

To sum up, in the embodiment, the delay circuit 16 is provided to delay the detection signal measured by the current detector 13, while the cooling fans 6 are not operated in the preheating period. Then, the self-heating of the lamp is enhanced, and the light energy supplied through the optical fiber 9 can be stabilized. Thus, the preheating period can be shortened, and the optical energy after preheating can be stabilized early. Therefore, desired heating conditions can be reproduced at the start of heating.

Figure 4:
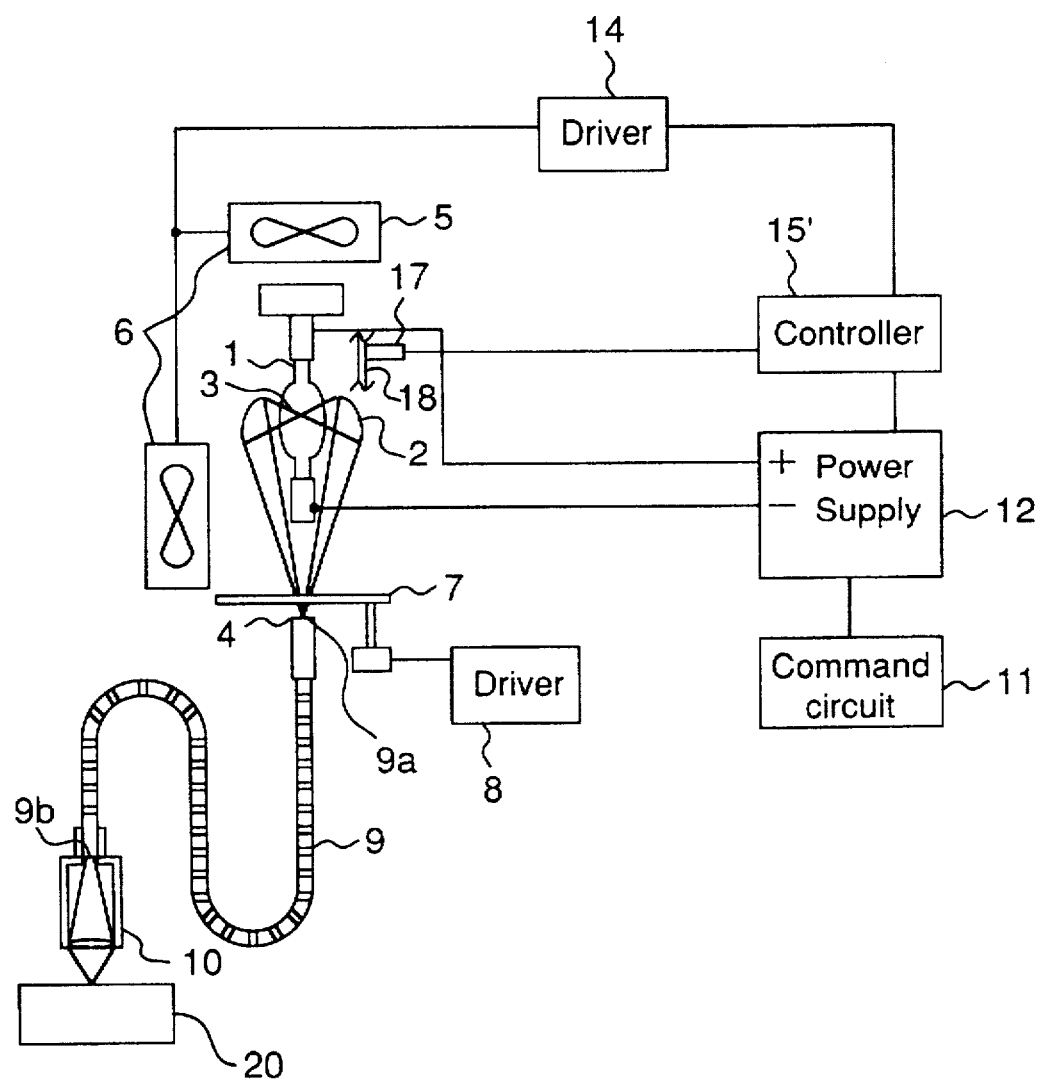
FIG. 4 is a diagram of a light beam heating apparatus of a second embodiment of the invention.

FIG. 4 shows a light beam heating apparatus according to a second embodiment of the invention, wherein like reference characters used in FIG. 1 designate like or corresponding parts and they are not explained here again. A temperature detector 17 is provided near the lamp 1 to detect the temperature of the lamp 1, while the current detector 13 and the delay circuit 16 used in FIG. 1 are not used. For example, the temperature detector 17 is fixed to a cover 18 (shown partly in FIG. 4) of the lamp 1.

Next, the operation of the light beam heating apparatus is explained. First, the lamp 1 is turned on by the power supply 12, and it lights with a constant lamp current. Similar to the apparatus of FIG. 1, the lamp 1 is not cooled by the fans 6 for a few minutes after being turned on.

The temperature detector 17 starts to monitor the temperature of the lamp 1 at the same time as the lighting of a prescribed lamp 1. When the temperature of the lamp 1 is detected, the controller 15' sends a start command to the driver 14 for the fans 6. Then, the driver 14 drives the fans 6 so as to cool the lamp 1. When the shutter 7 is opened by the driver 8 after the preheating, the lamp 1 emits a light with a current set by the command circuit 11, and a beam condensed by the elliptic mirror 2 is transmitted through the optical fiber 9 and condensed again by the lens system 10 to irradiate a material to be heated (not shown) for soldering of electronics parts, fusing of resin, or the like.

In this embodiment, because the temperature of the sealant of the lamp 1 is monitored by the temperature detector 17, the cooling of the lamp can be started when the temperature of the lamp 1 reaches the prescribed temperature. Therefore, the temperature of the sealant of the lamp 1 does not exceed the melting temperature thereof. This embodiment is especially advantageous for preventing melting and deterioration of the sealant when the temperature of the lamp 1 is higher than room temperature, for example, when irradiation is repeated.

To sum up, in the embodiment, the temperature detector 17 is provided near the lamp 1 to constantly monitor the temperature of the lamp 1, while the cooling fans 6 are not operated during the preheating period. Then, the self-heating of the lamp is enhanced, and the light energy supplied through the optical fiber 9 can be stabilized. Thus, the preheating period can be shortened, and the optical energy after preheating can be stabilized early. Therefore, desired heating conditions can be reproduced at the start of heating.

Optical energy is measured at the outgoing end 9b of the optical fiber 9 of the apparatus shown in FIG. 4 similar to that shown in FIG. 2. As explained above, after the lamp 1 is preheated with a constant current for a few minutes after turned on, the lamp 1 is heated with a current according to a command received from the command circuit 11 and the shutter 7 is opened. Then, the light energy is measured with a power meter for thirty minutes. Though the data is not shown, the data is similar to that shown in 2, and the optical energy is found to be stable for a long time.

Figure 5:
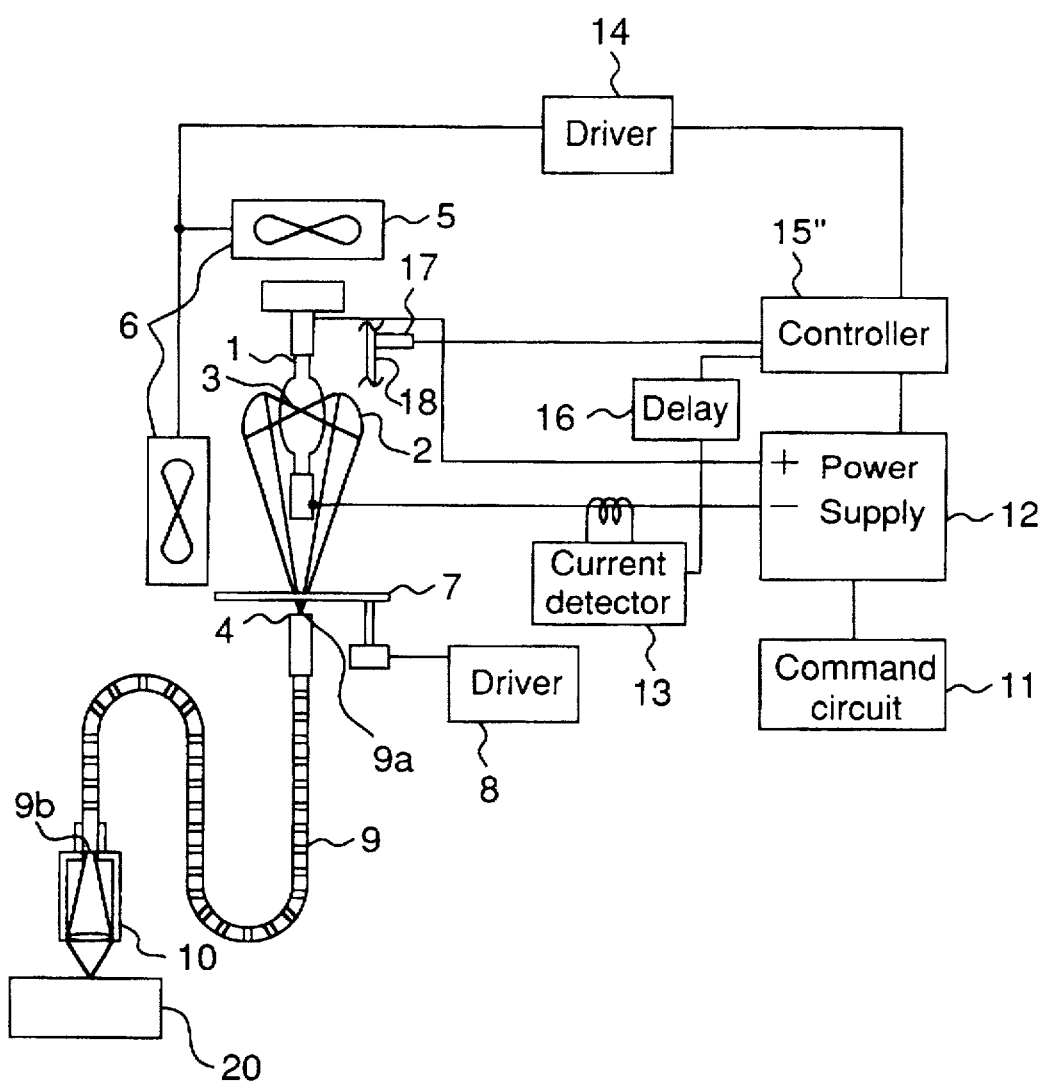
FIG. 5 is a diagram of a light beam heating apparatus of a third embodiment of the invention.

FIG. 5 shows a light beam heating apparatus according to a third embodiment of the invention, wherein like reference characters used in FIGS. 1 and 4 designate like or corresponding parts and they are not explained here again. In this embodiment, the current detector 13 and the delay circuit 16 used in the first embodiment and the temperature detector 17 used in the second embodiment are provided at the same time.

Next, the operation of the light beam heating apparatus is explained. First, the lamp 1 is turned on by the power supply 12, which provides a constant lamp current. The current detector 13 starts to detect the lamp current at the same time as the lighting of the lamp 1, and the delay circuit 16 sends the current detection value after the predetermined time to the controller 15". On the other hand, the temperature detector 17 starts to monitor the temperature of the lamp 1 at the same time as the lighting of the lamp 1. Then, at the earlier time of when the temperature of the lamp 1 is detected to reach a prescribed temperature, or when the delay circuit 16 sends the detection current, the controller 15" sends a start command to the driver 14 for the fans 6. Then, the driver 14 drives the fans 6 and cools the lamp 1. When the shutter 7 is opened by the driver 8 after the preheating period, the lamp 1 emits a light with a current set by the command circuit 11, and a beam condensed by the elliptic mirror 2 is transmitted through the optical fiber 9 and condensed again by the lens system 10 to irradiate a material to be heated (not shown) for soldering of electronics parts, fusing of resin, or the like.

In this embodiment, when the temperature of the lamp 1 is room temperature, the lighting of the lamp 1 is controlled by the current detector 13 and the temperature detector 17, while when the temperature of the lamp 1 is above room temperature, the lighting of the lamp 1 is controlled by the temperature detector 17. Therefore, the optical energy can be controlled more precisely.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A light beam heating apparatus comprising:

a light source including a lamp;

a condensing means for condensing a light emitted by said light source;

a cooling device for cooling said lamp;

a command means for sending a command to set a lighting power;

a power supply for supplying current to said lamp according to a command received from said command means;

a current detector for detecting the current supplied by said power supply;

a delay element for delaying an output signal of said current detector;

a controller for sending a command to said cooling device when said controller receives an output of said delay element; and a driver for driving said cooling device when a command is received from said controller.

2. The apparatus according to claim 1, wherein said lamp is a Xenon lamp.

3. The apparatus according to claim 1, further comprising a temperature detector for detecting a temperature of the lamp, wherein said controller sends a command to said cooling device at an earlier time of when said controller receives an output from said delay element or when a temperature, detected by said temperature detector, exceeds a predetermined temperature.

4. The light beam heating apparatus according to claim 1, wherein said cooling device comprises a plurality of cooling fans.

5. The light beam heating apparatus according to claim 1, further comprising:

a shutter disposed adjacent to a light beam emitting side of said condensing means;

an optical fiber having a first end and a second end, wherein said first end is disposed adjacent to said shutter for receiving a light beam condensed by said condensing means; and a lens unit connected to said second end of said optical fiber.

6. The light beam heating apparatus according to claim 5, wherein said condensing means comprises an elliptic mirror.

7. A light beam heating apparatus comprising:

a light source including a lamp;

a condensing means for condensing a light emitted by said light source;

a command means for sending a command to set a lighting power;

a power supply for supplying a current to said lamp in accordance with a command received from said command means;

a temperature detector for detecting a temperature of said lamp;

a cooling device for cooling said lamp;

a controller operatively connected to said cooling device such that said controller permits said cooling device to be operated only after said power supply is actuated to supply current to said lamp and a predetermined temperature is detected by said temperature detector; and a driver operatively connected to said cooling device such that, when a command is received from said controller, said driver is operated to drive said cooling device.

8. The light beam heating apparatus according to claim 7, wherein said lamp comprises a Xenon lamp.

9. The light beam heating apparatus according to claim 7, wherein said cooling device comprises a plurality of cooling fans.

10. The light beam heating apparatus according to claim 7, further comprising:

a shutter disposed adjacent to a light beam emitting side of said condensing means;

an optical fiber having a first end and a second end, wherein said first end is disposed adjacent said shutter for receiving a light beam condensed by said condensing means; and a lens unit connected to said second end of said optical fiber.

11. The light beam heating apparatus according to claim 10, wherein said condensing means comprises an elliptic mirror.

* * * * *